Sept. 4, 1962   F. G. WEIS   3,052,260
CHECK VALVE WITH PNEUMATIC ASSISTING MEANS FOR POSITIVE CLOSING
Filed April 4, 1960
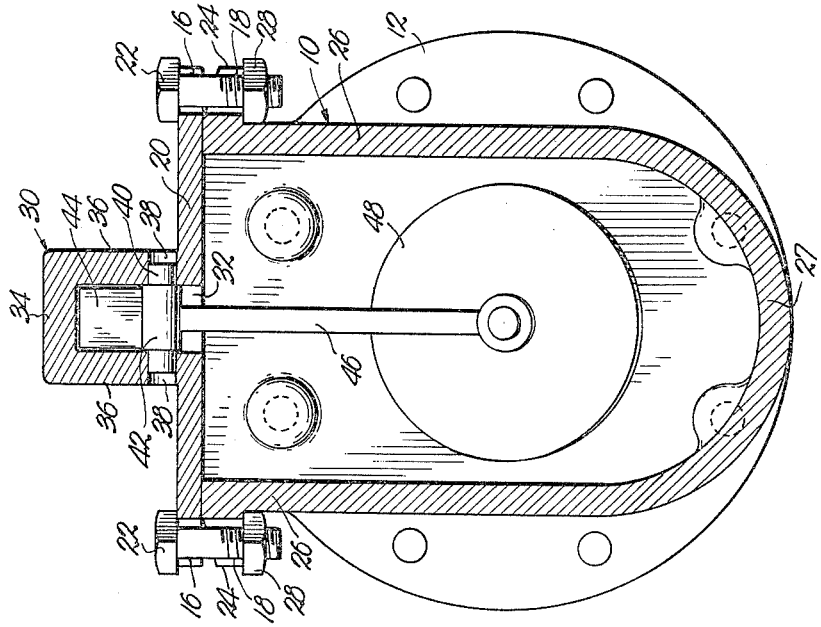
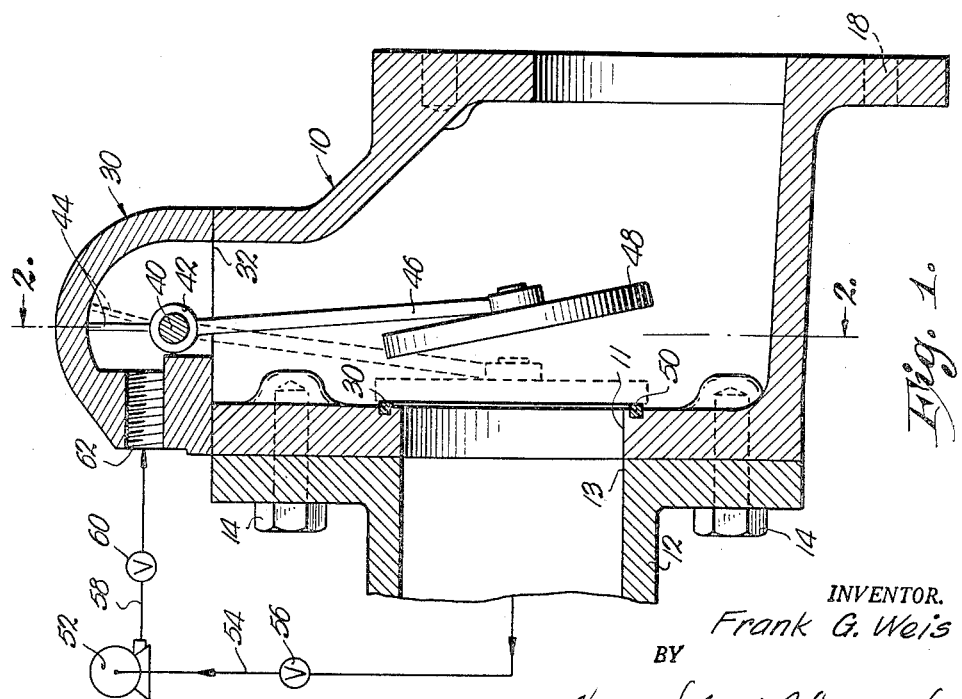
INVENTOR.
Frank G. Weis
BY
Hovey, Schmidt, Johnson & Hovey
ATTORNEYS.

United States Patent Office 3,052,260
Patented Sept. 4, 1962

3,052,260
CHECK VALVE WITH PNEUMATIC ASSISTING MEANS FOR POSITIVE CLOSING
Frank G. Weis, Kansas City, Mo., assignor to Union Tank Car Company, Chicago, Ill., a corporation of New Jersey
Filed Apr. 4, 1960, Ser. No. 19,682
4 Claims. (Cl. 137—565)

The present invention relates to check valves and more particularly to a check valve for use in a material flow system.

It is common practice in the field of check valves for use in a material flow system to construct and place the valve to be operated by the flow of the material in the system to open and to be spring biased to close when the force of the material flow is less than the force of the biasing means.

The present invention proposes to provide a check valve for use in a material flow system which is constructed to be gravitationally biased toward a normal open position and which is selectively biasable toward the closed position by fluid pressure other than that of the material flowing in the system.

It is therefore an object of the present invention to provide a check valve which has a normal open position for material flow therethrough and which has a fluid flow means other than material flowing through the valve connected therewith to forcibly close the valve against material flow therethrough.

It is another important object of the present invention to provide a check valve assembly of the type described above wherein the force applied to the check valve is air under pressure.

It is still another object of the present invention to provide a check valve assembly wherein an air vane is provided on the check valve for receiving the force of the air under pressure and a housing is provided around the vane for concentrating the air flow thereon.

It is still a further object of the present invention to provide an air operated check valve for use in a material flow system wherein a pump is provided, the discharge opening of which is the source of air under pressure and wherein the valve operates to open and close a port in a chamber.

It is a further object of the present invention to provide an air operated check valve for use in a material flow system as described above wherein the chamber is connected to the intake of the pump to create a vacuum in the chamber when the valve is closed, the vacuum holding the valve in the closed position.

Another object of the present invention is to provide an air operated check valve for use in a material flow system as above described wherein selectively operable means are coupled with said intake and discharge to selectively couple them with the chamber and valve respectively.

Further objects and advantages of the present invention will appear as this description proceeds.

In the drawings:
FIGURE 1 is a side elevational section through a valve assembly embodying the present invention; and
FIG. 2 is a front elevational section taken along lines 2—2 of FIG. 1.

In the drawings and in FIG. 1 in particular there is shown a check valve assembly indicated generally by the numeral 10. A chamber 12 is shown connected to check valve assembly 10 by bolts 14. Chamber 12 is provided with a port 13 and assembly 10 with a port 11. Ports 11 and 13 register with each other as can best be seen in FIG. 1. Valve assembly 10 is generally U-shaped in cross section, having legs 26 and a bottom 27, as shown in FIG. 2, and a cover 20 is provided therefor. Cover 20 has openings 16 provided for bolts 22. Openings 16 register with openings 18 in ears 24 of valve assembly 10. The ears 24 are shown in FIG. 2 to be proximal the open end of U-shaped valve assembly 10 on legs 26. Nuts 28 are provided to be threaded on bolts 22 which have been placed through the registering openings 16 in cover 20 and 18 in ears 24 so that the cover 20 may be bolted tightly down over the open end of U-shaped assembly 10. A pivot housing 30 is integral with and extends upwardly from cover 20 and is shown in FIG. 2 as the shape of an inverted U in cross section. The housing has upwardly extending legs 36 and a top 34 defining an opening 44 registering with an opening 32 in cover 20. In each leg 36 immediately adjacent to its point of juncture with cover 20 there is a cylindrical bore 38. A pivot pin 40 is journaled in cylindrical bores 38. Telescoped on pin 40 is a generally cylindrical bearing 42 having a vane 44 extending up into the pivot housing 30 and a valve stem 46 extending downwardly through opening 32.

Fixed to the end of stem 46 remote from bearing 42 is one side of an annular closure member 48 which is shown as being generally circular but which could be constructed to be the shape of any opening it is desired to close. On the side of closure member 48 opposite to the side of its connection with stem 46 an O-ring seal 50 is mounted. Seal 50 is of slightly greater diameter than port 11 and is mounted on closure member 48 near the outer periphery thereof for reasons which will become apparent as this description proceeds.

As the present structure has been described, it will be noted that the valve is constructed and pivoted to have a disposition of masses thereof such that the center of gravity of the valve normally will cause it to seek and hold the solid line position shown in FIG. 1.

Means are schematically illustrated in FIG. 1 including a pump 52 and a first conduit 54 interconnecting pump 52 with chamber 12. A first control valve 56 is illustrated in conduit 54 which permits selective interconnection of conduit 54 and pump 52 with chamber 12. It is to be understood that conduit 54 is connected with the intake side of pump 52. Connected with the discharge side of pump 52 is a second conduit 58 having a second control valve 60 therein. Conduit 58 is connected with threaded orifice 62 in pivot housing 30, and permits selective connection of the discharge of pump 52 and housing 30.

In operation, when it is desired to close ports 11 and 13, pump 52 is interconnected with orifice 62 by selectively operated valve 60 so that air under pressure from pump 52 is delivered through orifice 62 against vane 44 which is at that time in the solid line position shown in FIG. 1. The air flowing against vane 44 will cause it to move to the dotted line position in FIG. 1, thereby pivoting bearing 42 around pin 40 and moving stem 46 and member 48 toward the dotted line position in FIG. 1, closing off ports 11 and 13 against flow of material therethrough.

At the same time selectively operated valve 56 is operated to connect chamber 12 with the intake side of pump 52, creating a vacuum or suction in conduit 12. The vacuum holds closure member 48 in closing relation to ports 11 and 13 once the air pressure has moved member 48 to the dotted line position. It will be noted that the seal 50 engages with the walls of check valve assembly 10 immediately surrounding the port 11 of check valve assembly 10, thereby sealing off any communication between chamber 12 and assembly 10. Once member 48 has sealed off chamber 12, the suction or vacuum therein may be utilized to perform other jobs such as to bring material into chamber 12. Selectively operated valve 60 may be operated to disconnect pump 52 and orifice 62 once the valve reaches the closed position, suction holding member 48 in the closed position.

When it is desired to permit communication between chamber 12 and the assembly 10 for material flow through ports 13 and 11 it is a simple matter to operate selectively operated valve 56 to disconnect chamber 12 and pump 52 and thereby discontinue the vacuum or suction in chamber 12. Due to the construction of the check valve assembly previously described the check valve assembly will swing back to the solid line position under bias of gravity. Such opening movement of the valve may, of course, be assisted by the flow of material from chamber 12 through ports 13 and 11.

Having thus described the invention what is claimed as new and desired to be secured by Letters Patent is:

1. In a material flow system, a chamber having an outlet port; a check valve including a valve member adapted for closing said port, means mounting said member for movement between alternate positions for opening and closing said port, and means for biasing said member toward said port-opening position; a pump having an intake and a discharge; means for coupling said intake with said chamber; and means for directing a stream of flowable material from said discharge against a portion of said member to shift the latter into its port-closing positon.

2. The system as set forth in claim 1, wherein said means for coupling said intake with said chamber includes a selectively operable valve for selectively connecting and disconnecting said chamber and said pump, thereby permitting selective application of suction to said chamber to hold said valve member in the port-closing position and suck material into said chamber, and release of said chamber and valve from the influence of suction.

3. The system as set forth in claim 1, wherein said means for directing a stream of flowable material from said discharge against a portion of said member includes a selectively operable valve for selectively passing and interrupting said stream, thereby permitting alternate application of said stream to said valve member, and release of said valve member from the influence of said stream.

4. In positively operated, check valve apparatus, an assembly provided with a port for the flow of flowable material therethrough; means for coupling a source of flowable material with said assembly on one side of said port and in communication with the latter; an elongated, upright stem element; means pivotally mounting said element on said assembly for swinging movement of a lower portion of said element below said pivotal mounting toward and away from said port from the opposite side of the latter about a generally horizontal axis disposed above and in a plane spaced from said opposite side of said port; a valve member carried by said lower portion of said element for closing said port when said element is swung from a normal position thereof in which said member is spaced from said port into an operative position displaced from said normal position in a direction disposing said lower portion of said element closer to said port and said member in sealing relationship to said port; vane means carried by said element above said axis of pivotal mounting of the latter; means different than the force of pressure of said flowable material at said port and including a disposition of masses in said element, member and vane means locating the center of gravity of the latter relative to said axis for biasing said element toward its said normal position; a source of fluid other than said material, said fluid being under pressure; means for directing said fluid against said vane means for swinging said element in said direction and into its said operative position; and means for interrupting the flow of said fluid against said vane means.

References Cited in the file of this patent

UNITED STATES PATENTS

| 434,386 | Frizell | Aug. 12, 1890 |
| 1,039,749 | Ingram | Oct. 1, 1912 |

FOREIGN PATENTS

| 1,258 | Australia | Apr. 25, 1900 |
| 58,488 | Sweden | May 30, 1923 |